(12) United States Patent
Kauffman et al.

(10) Patent No.: US 8,301,196 B2
(45) Date of Patent: *Oct. 30, 2012

(54) RECONFIGURABLE WIRELESS MODEM ADAPTER INCLUDING DIVERSITY/MIMO MODEMS

(75) Inventors: Donald C. Kauffman, Laurel, MD (US); Alfonso Malaga, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 72 days.

This patent is subject to a terminal disclaimer.

(21) Appl. No.: 13/016,319

(22) Filed: Jan. 28, 2011

(65) Prior Publication Data
US 2012/0033718 A1 Feb. 9, 2012

Related U.S. Application Data

(63) Continuation-in-part of application No. 12/849,502, filed on Aug. 3, 2010.

(51) Int. Cl.
*H04B 1/38* (2006.01)

(52) U.S. Cl. .......... 455/557; 455/556.1; 455/556.2; 455/431; 455/66.1; 455/103; 455/345; 342/357.53; 340/949; 379/93.28

(58) Field of Classification Search ........... 455/556.1, 455/557, 66.1, 103, 431; 342/357.53; 375/222; 379/93.28; 340/949
See application file for complete search history.

(56) References Cited

U.S. PATENT DOCUMENTS

| | | | |
|---|---|---|---|
| 5,883,586 A | 3/1999 | Tran et al. | |
| 5,992,290 A | 11/1999 | Quebedeaux et al. | |
| 6,072,994 A | 6/2000 | Phillips et al. | |
| 6,167,238 A * | 12/2000 | Wright | 455/66.1 |
| 6,477,359 B2 | 11/2002 | Heppe et al. | |
| 7,016,674 B2 * | 3/2006 | Jones et al. | 455/431 |
| 7,103,456 B2 * | 9/2006 | Bloch et al. | 701/3 |
| 7,136,643 B2 | 11/2006 | Campbell | |
| 7,260,376 B2 | 8/2007 | Hogyoku | |
| 7,263,335 B2 | 8/2007 | Leabman | |

(Continued)

FOREIGN PATENT DOCUMENTS

EP 1648098 10/2005

(Continued)

OTHER PUBLICATIONS

European Patent Office, "European Search Report", "(from parent case, which is U.S. Appl. No. 12/849,502)", mailed Nov. 2, 2011, Published in: EP.

(Continued)

*Primary Examiner* — Marceau Milord
(74) *Attorney, Agent, or Firm* — Fogg & Powers LLC

(57) ABSTRACT

A reconfigurable wireless modem adapter is provided. The reconfigurable wireless modem adapter includes a control board and a radio frequency switch. The control board includes at least two user-data interfaces for respective at least two modems, the modems including at least one diversity/multiple-input-multiple-output (MIMO) modem. The control board is configured to communicatively couple to at least one onboard system in a vehicle and to activate one of the at least one diversity/MIMO modem interfaced to one of the at least two user-data interfaces. The radio frequency switch is communicatively coupled to the control board via a modem-select interface and the selected one of the at least one diversity/MIMO modem. The radio frequency switch communicatively couples one of at least one diversity/MIMO antenna on the vehicle to the selected one of the at least one diversity/MIMO modem based on a control signal.

20 Claims, 5 Drawing Sheets

U.S. PATENT DOCUMENTS

| | | | |
|---|---|---|---|
| 7,353,090 B2 | 4/2008 | Leonard et al. | |
| 7,356,389 B2 * | 4/2008 | Holst et al. | 701/3 |
| 7,460,839 B2 | 12/2008 | Leabman | |
| 7,489,992 B2 * | 2/2009 | Valette et al. | 701/34.3 |
| 7,548,533 B2 * | 6/2009 | Reitmann et al. | 370/338 |
| 7,620,374 B2 * | 11/2009 | Ziarno et al. | 455/98 |
| 7,765,356 B2 * | 7/2010 | Weber | 710/314 |
| 7,868,276 B2 * | 1/2011 | Grimshaw et al. | 244/3.1 |
| 7,869,385 B2 * | 1/2011 | Leonard et al. | 370/257 |
| 8,019,338 B2 * | 9/2011 | Malaga et al. | 455/431 |
| 8,022,843 B2 * | 9/2011 | Mitchell et al. | 340/973 |
| 8,081,933 B2 * | 12/2011 | Malaga et al. | 455/90.2 |
| 2002/0004411 A1 | 1/2002 | Heppe et al. | |
| 2005/0228559 A1 | 10/2005 | Bloch et al. | |
| 2007/0243505 A1 | 10/2007 | Rath et al. | |

FOREIGN PATENT DOCUMENTS

| | | |
|---|---|---|
| EP | 2015473 | 7/2008 |
| EP | 2129006 | 5/2009 |
| EP | 2416500 | 8/2012 |

OTHER PUBLICATIONS

European Patent Office, "European Search Report", mailed Jun. 1, 2012, Published in: EP.

U.S. Patent and Trademark Office, "Final Office Action", "U.S. Appl. No. 12/849,502", Aug. 1, 2012, pp. 1-18.

U.S. Patent and Trademark Office, "Office Action", "U.S. Appl. No. 12/849,502", Feb. 27, 2012.

European Patent Office, "Office Action", Jul. 6, 2012, Published in: EP.

* cited by examiner

RECONFIGURABLE WIRELESS MODEM ADAPTER INCLUDING DIVERSITY/MIMO MODEMS The present application is a continuation-in-part of, and claims priority to, U.S. patent application Ser. No. 12/849,502 (pending), filed on Aug. 3, 2010, and entitled "RECONFIGURABLE WIRELESS MODEM ADAPTER" (the '502 Application). The '502 Application is herein incorporated by reference in its entirety.

BACKGROUND

Aircraft owners would like to take advantage of existing and emerging data service offerings from data service providers to electronically move data onto and off of their aircraft. Current offerings such as WiFi, WiMax, and the various $3^{rd}$ Generation (3G) wireless data services offer cost effective benefits to the airlines. However, aircraft owners have a difficult time deciding which service provider to utilize since generational evolutions in data services and technologies change on the order of years. An aircraft has a typical lifetime of 25 years or more. It is desirable for the avionics for any particular aircraft to be in operation for that same timeframe, due to the high cost of certified avionics and the high cost of aircraft out-of-service time related to installing and certifying new avionics installations.

SUMMARY

The present application relates to a reconfigurable wireless modem adapter. The reconfigurable wireless modem adapter includes a control board and a radio frequency switch. The control board includes at least two user-data interfaces for at least two respective modems, the at least two modems including at least one diversity/multiple-input-multiple-output (MIMO) modem. The control board is configured to communicatively couple to at least one onboard system in a vehicle. The control board is configured to activate one of the at least one diversity/MIMO modem interfaced to one of the at least two user-data interfaces when the one of the at least one diversity/MIMO modem is selected by the control board. The radio frequency switch is communicatively coupled to the control board via a modem-select interface and via the selected one of the at least one diversity/MIMO modem. The radio frequency switch is configured to communicatively couple one of at least one diversity/multiple-input-multiple-output (MIMO) antenna on the vehicle to the selected one of the at least one diversity/MIMO modem based on a control signal sent from the control board to the radio frequency switch via the modem-select interface.

DRAWINGS

Figure 1:
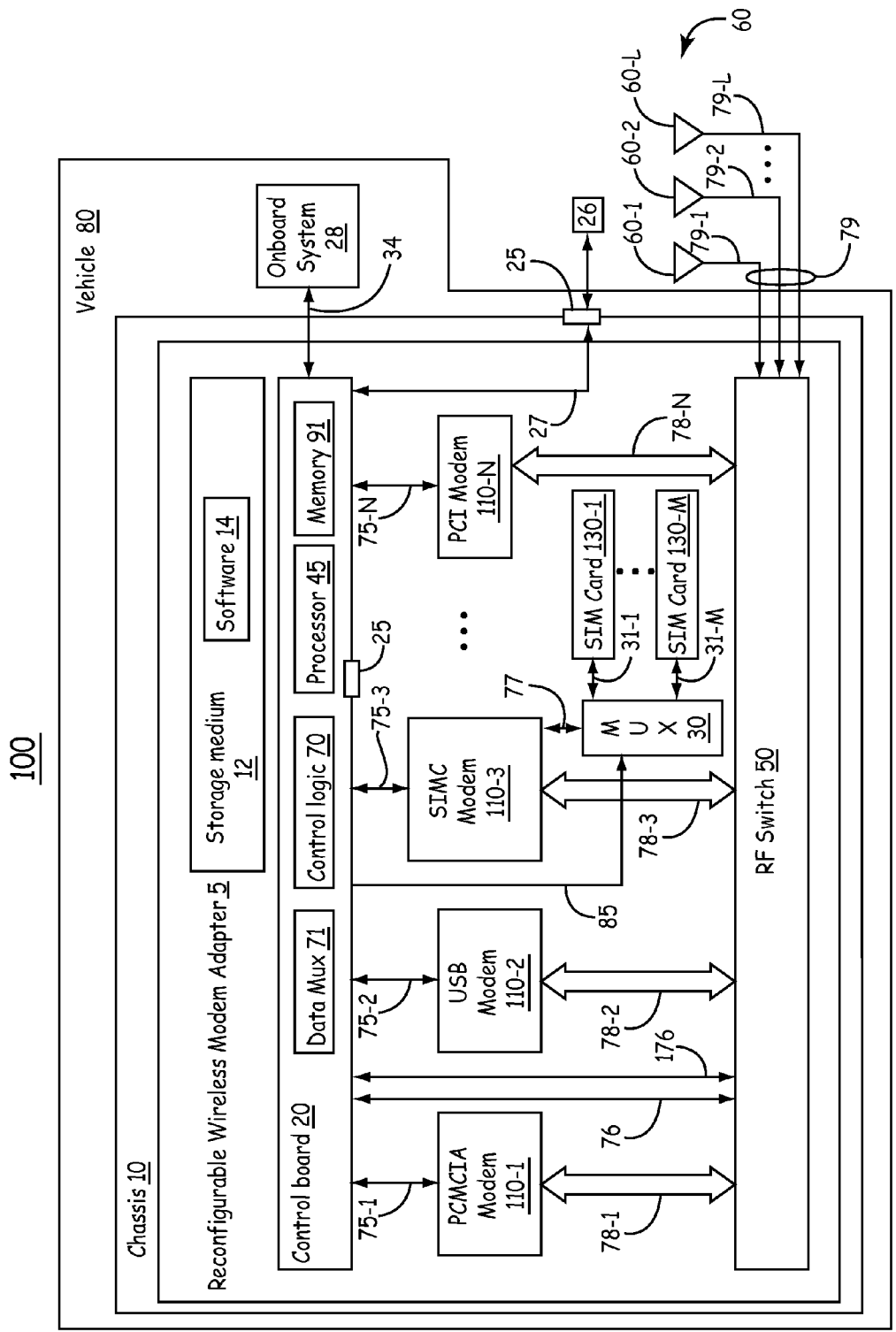
FIG. 1 is an embodiment of a reconfigurable wireless modem adapter in a reconfigurable-wireless-modem-adapter system in accordance with the present invention.
Figure 4:
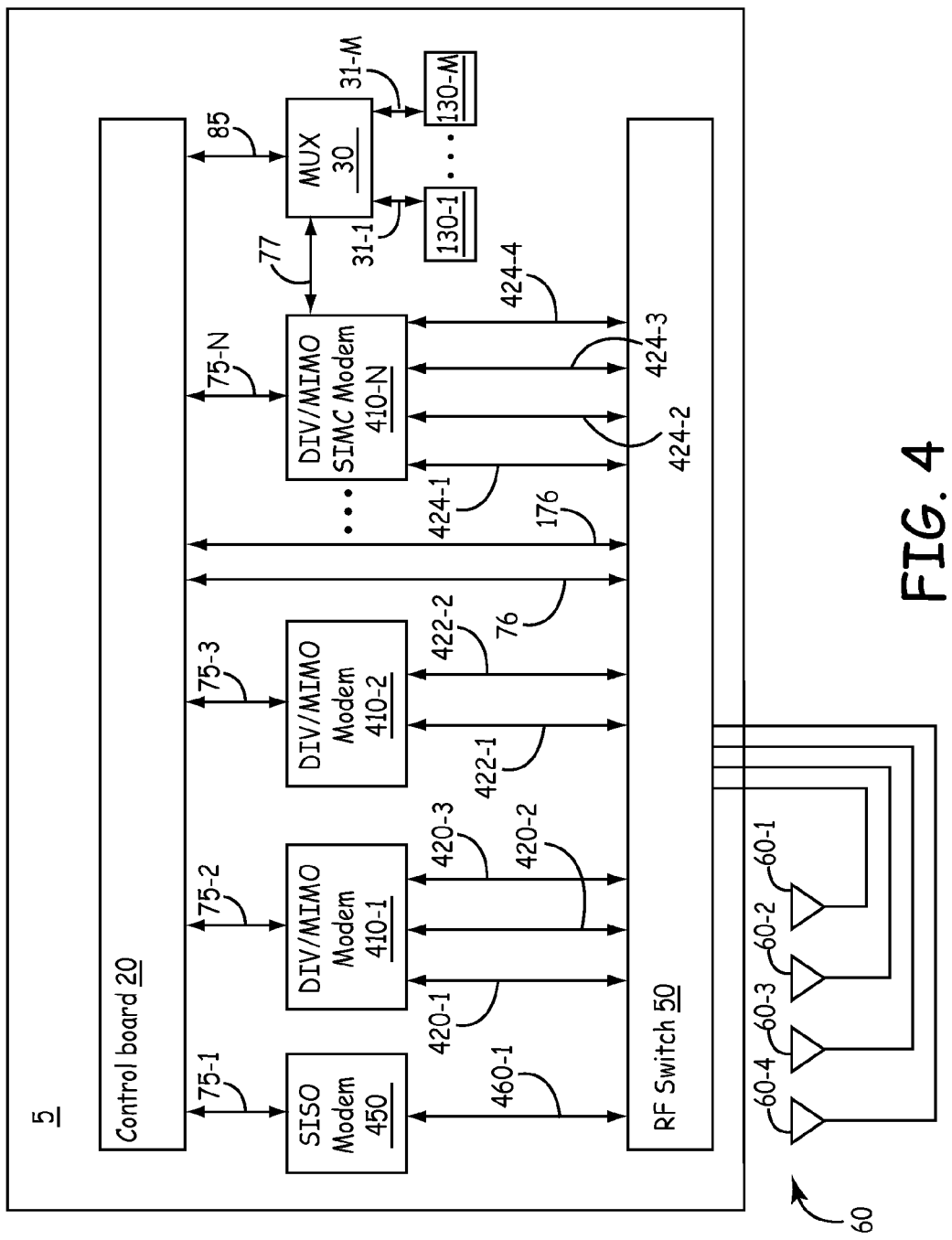
Figure 5:
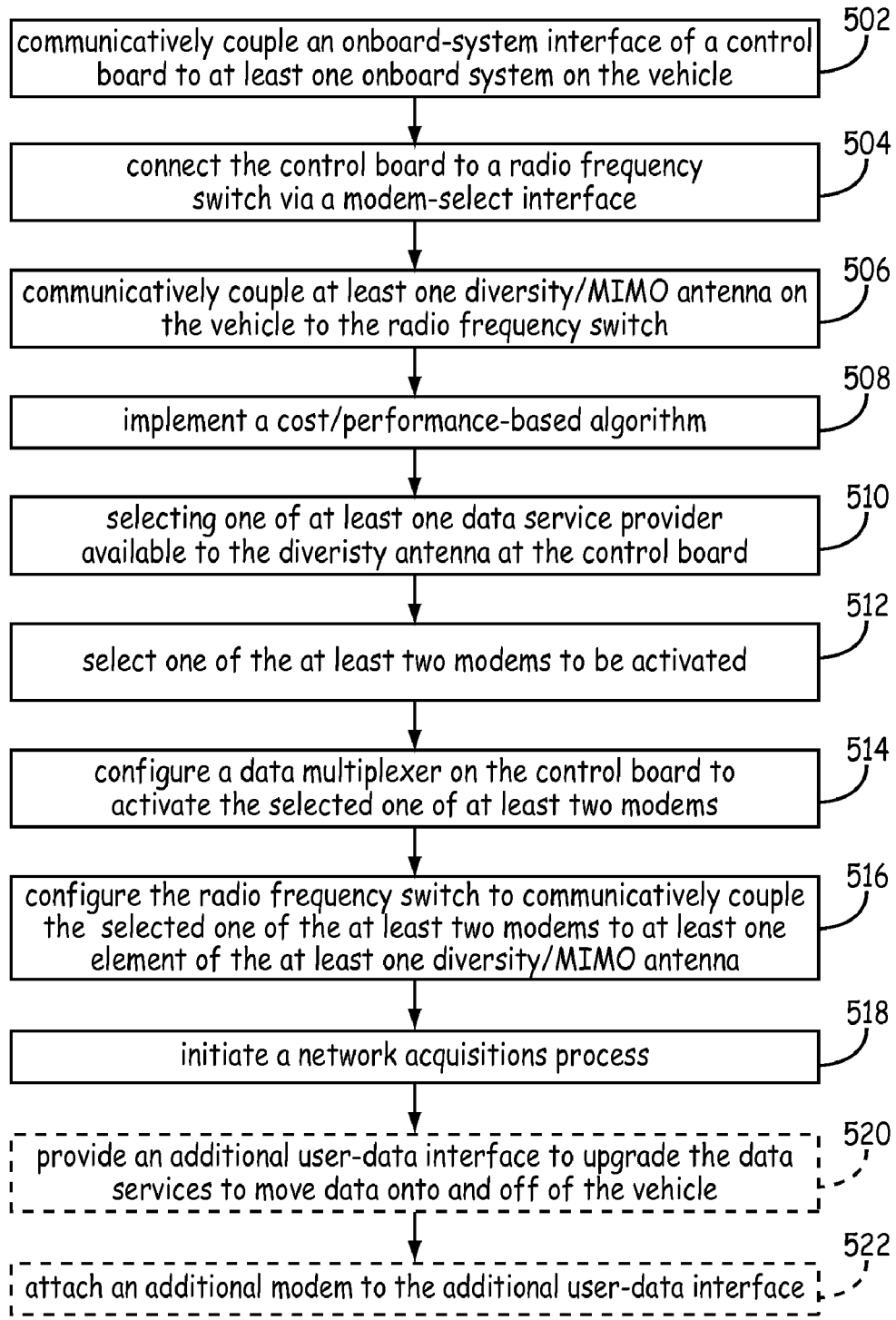

FIG. 4 shows an embodiment of diversity modems and a SISO modem in the reconfigurable wireless modem adapter of FIG. 1 for communicatively coupling a radio frequency switch to a control board in accordance with the present invention; and FIG. 5 is an embodiment of a method to reconfigurably move data onto and off of a vehicle via a reconfigurable wireless modem adapter in accordance with the present invention in accordance with the present invention.

In accordance with common practice, the various described features are not drawn to scale but are drawn to emphasize features relevant to the present invention. Like reference characters denote like elements throughout figures and text.

DETAILED DESCRIPTION

Aircraft owners would like to quickly and inexpensively upgrade their aircraft to the emerging data service technologies. Aircraft fly into several different regions, which may be serviced by different data service providers. The reconfigurable wireless modem adapter described herein selects one data service provider from one or more locally available data service providers based, at least in part, on cost and performance of the available data service providers. An aircraft owner may have different cost rate structures, different performance, or different quality of service (QoS) with different data service providers depending on location. The term "data service providers" is also referred to herein as "data services" or "service providers." As defined herein, "data services" are providers of data network infrastructures and radio frequency spectrum for real-time data network management and data transfer capabilities which they offer to subscribers. For example, Verizon, ATT, T-Mobile, and NTT implement 3rd Generation (3G) wireless networks, Boingo and Waypoint implement WiFi networks, and Nth Air and Main Street Broadband implement WiMax networks to transfer data to and from compatible subscriber data devices.

FIG. 1 is an embodiment of a reconfigurable wireless modem adapter 5 in a reconfigurable-wireless-modem-adapter system 100 in accordance with the present invention. The reconfigurable-wireless-modem-adapter system 100 includes the reconfigurable wireless modem adapter 5, a diversity/multiple-input-multiple-output (MIMO) antenna 60, and an onboard system 28. The onboard system 28 is onboard a vehicle 80. The exemplary diversity/MIMO antenna 60 includes antenna elements 60(1-L), each antenna element 60(1-L) being a single antenna. The elements 60(1-L) in the diversity/MIMO antenna 60 are also referred to herein as "elements 60(1-L)". The elements 60(1-L) in the diversity/MIMO antenna 60 are attached to the outside of the vehicle 80. In one implementation of this embodiment, at least one of the elements 60(1-L) in the diversity/MIMO antenna 60 is a fuselage-mounted antenna 60-$i$, where i indicates the $i^{th}$ antenna 60.

As shown in FIG. 1, the reconfigurable wireless modem adapter 5 is housed in a chassis 10 onboard the vehicle 80. In another implementation of this embodiment, the reconfigurable wireless modem adapter 5 is housed in a cabinet in the vehicle 80. In one implementation of this embodiment, the vehicle 80 is an aircraft 80. Therefore, the "vehicle 80" is also referred to herein as "aircraft 80." In another implementation of this embodiment, the vehicle 80 is a water vehicle or a land-based vehicle.

The reconfigurable wireless modem adapter 5 includes a control board 20, a radio frequency (RF) switch 50, software 14 in a non-transitory storage medium 12, and at least one modem. The at least one modem is shown in FIG. 1 as a plurality of different types of modems 110(1-N).

In the embodiment shown in FIG. 1, the reconfigurable wireless modem adapter 5 includes a digital multiplexer 30. The digital multiplexer 30 includes subscriber identity module (SIM) interfaces (slots) 31(1-M) for two or more subscriber identity module (SIM) cards 130(1-M). At least one subscriber identity module card 130-1 is attached to (inserted into) an interface 31-1 on the digital multiplexer 30. The digital multiplexer 30 is a digital switch that communicatively couples one of at least two SIM cards 130(1-M) to a subscriber-identity-module-compatible (SIMC) modem 110-3 under control of control board 20. Therefore, the digital multiplexer 30 is also referred to herein as a digital switch 30. The subscriber-identity-module-compatible modem 110-3 is a modem that is configured to accept and process input from a SIM card.

A control line 85 connects the control board 20 to the digital switch 30. The control board 20 sends a control signal to the digital switch 30 via the control line 85. The digital switch 30 connects one of the at least two SIM cards 130(1-M) to the control board 20 via the subscriber-identity-module-compatible modem 110-3 based on the control signal received from the control board 20. The subscriber-identity-module-compatible modem 110-3 is connected to the RF switch 50 by the digital interface 78-3. The subscriber-identity-module-compatible modem 110-3 is connected to the control board 20 by the user-data subscriber-identity-module-compatible modem interface 75-3. In this manner, the control board 20 is communicatively coupled to the RF switch 50 via the subscriber-identity-module-compatible modem 110-3. In one implementation of this embodiment, the subscriber-identity-module-compatible modem 110-3 is one of a PCMCIA Modem that is compatible with a SIM card, a USB modem that is compatible with a SIM card, or a PCI modem that is compatible with a SIM card. In another implementation of this embodiment, there is no digital multiplexer 30.

The control board 20 includes a data multiplexer 71, control logic 70, a processor 45, and a memory 91. The control board 20 also includes user-data interfaces represented generally at 75(1-N) for the respective modems 110(1-N). The user-data interfaces 75(1-N) are digital connectors connected to the control board 20 that are configured to accept modems 110(1-N). In one implementation of this embodiment, the user-data interfaces 75(1-N) are the digital connectors that are connected to the control board 20 by cables. In this case, the $i^{th}$ modem 110-$i$ is attached to the cable. In another implementation of this embodiment, the digital connectors are slots formed on the control board 20. In this case, the $i^{th}$ modem 110-$i$ is a modem card that is inserted into the slot. Thus, the modems 110(1-N) are also referred to here as modem cards 110(1-N). In some embodiments, the control board 20 includes both cable and slot user-data interfaces 75(1-N).

The control board 20 is also connected to at least one data-loader interface 25 on the chassis 10 via a connection 27. The data-loader interface 25 interfaces a data loader 26 to the software 14 in storage medium 12 and/or the memory 91. Data loaders 26 are avionics maintenance equipment. In some embodiments, data loaders 26 include a memory card, a data compact disc (CD) player, or another mass storage device used to upload new programs and data to avionics devices. The data loader 26 is attached by a technician or operator into the data-loader interface 25. In one implementation of this embodiment, the data loader 26 is a card that is inserted into a slot, which is the data-loader interface 25. In another implementation of this embodiment, the data loader 26 is communicatively coupled to load data onto the control board 20. In yet another implementation of this embodiment, the data loader 26 is communicatively coupled to the control board 20 to update the software 14 and/or the memory 91. In yet another implementation of this embodiment, the data loader 26 is communicatively coupled to load data onto the onboard system 28 via the control board 20. These embodiments thus allow simple upgrades to be provided to the onboard system 28, the software 14, and/or the memory 91. In yet another implementation of this embodiment, the data-loader interface 25 is on the reconfigurable wireless modem adapter 5 and the chassis 10 is opened by a technician to insert the data loader 26 into the data-loader interface 25 during an upgrade.

The plurality of modems 110(1-N) are available from a number of different types of modem cards. At least one of the modems 110-$k$ (the $k^{th}$ modem) is a diversity/MIMO modem (also referred to herein as a "MIMO modem 110-$k$" and as a "diversity modem 110-$k$") which includes two or more radio frequency ports that are connected to a respective two or more antenna elements 60-$i$ and 60-$j$ of the diversity antenna 60, where 60-$j$ is an $j^{th}$ antenna element in the diversity/MIMO antenna 60. Every embodiment described herein includes at least one diversity/MIMO modem 110-$k$. In one implementation of this embodiment, at least one of the other modems 110-$i$ (the $l^{th}$ modem) is a single-input-single-output (SISO) modem 110-$i$.

As shown in FIG. 1, one modem-type is a personal computer memory card international association (PCMCIA) card 110-1. In one implementation of this embodiment, the PCMCIA card 110-1 is a MIMO-PCMCIA card 110-1. In another implementation of this embodiment, the PCMCIA card 110-1 is a SISO-PCMCIA card 110-1. Another modem-type is a universal serial bus (USB) device 110-2. In one implementation of this embodiment, the USB card 110-2 is a MIMO-USB card 110-2. In another implementation of this embodiment, the USB card 110-2 is a SISO-USB card 110-2. Another modem-type is a subscriber-identity-module-compatible (SIMC) modem 110-3. In one implementation of this embodiment, the SIMC card 110-3 is a MIMO-SIMC card 110-3. In another implementation of this embodiment, the SIMC card 110-3 is a SISO-SIMC card 110-3. Another modem-type is a peripheral component interconnect (PCI) card 110-N. In one implementation of this embodiment, the PCI card 110-2 is a MIMO-PCI card 110-2. In another implementation of this embodiment, the PCI card 110-2 is a SISO-PCI card 110-2.

The reconfigurable wireless modem adapter 5 includes any combination of two or more of the following: one or more user-data PCMCIA interfaces 75-1, one or more user-data USB interfaces 75-2, one or more user-data subscriber-identity-module-compatible modem interfaces 75-3, and one or more user-data PCI interfaces 75-N.

The at least two modems are one or more of the following: at least one diversity/MIMO PCMCIA modem, at least one diversity/MIMO USB modem, at least one diversity/MIMO PCI modem, and at least one diversity/MIMO modem that is operable to interface with a subscriber identity module card. In one implementation of this embodiment, one of the at least two modems is a one of a SISO-PCMCIA modem, a SISO-USB modem, a SISO-PCI modem, and a SISO subscriber-identity-module-compatible diversity modem that is operable to interface with a SIM card.

Thus, embodiments of the reconfigurable wireless modem adapter 5 described herein utilize personal computer memory card international association (PCMCIA) cards (diversity or SIMO), peripheral component interconnect (PCI) cards (diversity or SIMO), and/or universal serial bus (USB) devices (diversity or SIMO) that are currently used to provide data services to laptops and bring them into the aerospace market.

In one implementation of this embodiment, the reconfigurable wireless modem adapter 5 includes only two user-data interfaces 75-1 and 75-2. In another implementation of this embodiment, the reconfigurable wireless modem adapter 5 includes a plurality of each type of user-data interfaces 75(1-N). In yet another implementation of this embodiment, the reconfigurable wireless modem adapter 5 includes future-developed user-data interfaces.

The radio frequency switch 50 is controlled by a control signal sent from the control board 20 via a modem-select interface 76. The radio frequency switch 50 is also communicatively coupled to the control board 20 via a radio frequency connection 176. The radio frequency switch 50 is also communicatively coupled to the control board 20 via the user-data interfaces 75(1-N), the modems 110(1-N), and the radio frequency links 78(1-N), respectively. Specifically, the radio frequency switch 50 is communicatively coupled to the control board 20 via the link including the user-data interface 75-1, the modem 110-1, and the radio frequency links 78-1 and via another parallel link including the user-data interface 75-2, the modem 110-2, and the radio frequency links 78-2. In this manner, the radio frequency switch 50 is communicatively coupled to the control board 20 in parallel via at least two of the plurality of modems 110(1-N).

The radio frequency links 78(1-N) are represented by a block arrows labeled 78(1-N), which is representative of one or more radio frequency links that extend from one or more radio frequency ports in the modems 110(1-N) to the radio frequency switch 50.

The radio frequency switch 50 is communicatively coupled via the radio frequency connector 79 on the reconfigurable wireless modem adapter 5 to the diversity/MIMO antenna 60 on the vehicle 80. The radio frequency connector 79 includes a plurality of radio frequency connectors 79(1-L) that each communicatively couple the radio frequency switch 50 to a respective one of the antenna elements 60(1-L) in the diversity/MIMO antenna 60.

The radio frequency switch 50 is an RF switching matrix. The control signal sent from the control board 20 to the RF switch 50 via the modem-select interface 76 is used to configure the RF switch 50 so that a selected modem is communicatively coupled to antenna 60 via RF switch 50.

The radio frequency links 78(1-N) are wireless data links, such as WiFi, WiMax, and the various $3^{rd}$ Generation (3G) and $4^{th}$ Generation (4G) wireless data services. The radio frequency links 78(1-N) can also include future-generation RF link technologies. The RF connector 79 is an RF cable, which connects the reconfigurable wireless modem adapter 5 to the diversity/MIMO antenna 60. The onboard system 28 is communicatively coupled to the control board 20 by a digital onboard-system interface 34. In one implementation of this embodiment, the digital interface 34 is a cable.

In another implementation of this embodiment, the RF switch 50 filters the incoming signals (from ground) to identify the spectral content of the signals being received at the RF switch 50 from the diversity/MIMO antenna 60. This spectral content is sent from the RF switch 50 to the control board 20 via the radio frequency connection 176. The processor 45 correlates the information regarding the spectral content of signals available at the diversity/MIMO antenna 60 from service providers based on data stored in the memory 91. In this manner, the processor 45 determines which service providers are currently available via the diversity/MIMO antenna 60, and obtains the information indicative of data bandwidth available from the currently available service providers.

The memory 91 also stores the cost of using the service providers (including the currently available service providers), and the quality of service provided by the service providers (including the currently available service providers). The processor 45 implements the software 14 to select from the currently available service providers based on a cost-bandwidth analysis or based on some other user provided criteria.

In yet another implementation of this embodiment, the control board 20 receives information indicative of the location of the vehicle 80 from onboard system 28 and determines which data services are currently available based on a look-up table stored in memory 91. The look-up table includes a list of data service providers that are typically available at a given location. In one implementation of this embodiment, the vehicle 80 is an aircraft and the look-up table includes a list of data service providers that are typically available at various airports at which the aircraft 80 is likely to land.

The control board 20 in the reconfigurable wireless modem adapter 5 includes control logic 70 and processing capability (e.g., the processor 45) to determine which data service (and thus which modem 110(1-N)) to use based on a number of parameters including network availability and geographical location. In one implementation of this embodiment, the user of the wireless modem adapter 5 is able to over-ride the selection of the wireless modem adapter 5. The processor 45 executes the software 14 to select one of at least one data service provider available to the diversity/MIMO antenna 60. Then the processor 45 selects an $i^{th}$ selected modem 110-$i$ from the plurality of modems 110(1-N) that are interfaced to one of the respective user-data interfaces 75(1-N) based on the selected service provider. The processor 45 sends the information indicative of the selected modem 110-$i$ to the control logic 70.

The control logic 70 then configures the digital multiplexer 71 to communicatively couple the selected modem 110-$i$ to the onboard system 28. The data multiplexer 71 routes user data from the onboard system 28 to and from the selected modem 110-$i$.

The processor 45 also sends information indicative of the selected data service provider and the selected modem 110-$i$ to the radio frequency switch 50 via the modem-select interface 76. The information indicative of the selected data service provider and the selected modem 110-$i$ is carried by a control signal. The information indicative of the selected data service provider and the selected modem 110-$i$ is received at the radio frequency switch 50. The received information is used to configure the radio frequency switch 50 to communicatively couple the selected modem 110-$i$ to the diversity/MIMO antenna 60. In this manner, the control board 20 activates the $i^{th}$ selected modem 110-$i$ from the plurality of modems 110(1-N) that are interfaced to one of the respective user-data interfaces 75(1-N).

Then an end-to-end data transfer is enabled after the data multiplexer 71 and the RF switch 50 have been configured and a network acquisition process has been initiated and successfully completed. In this manner, the diversity/MIMO antenna 60 is communicatively coupled to the onboard system 28 via the RF switch 50, the selected modem 110-$i$, and the control board 20. Once the diversity/MIMO antenna 60 is communicatively coupled to the onboard system 28, data formatted according to the selected service provider is sent to and from the onboard system 28. The data can include data packets, data messages, and/or data streams.

By including several card slot user-data interfaces 75(1-N) for each of the personal computer memory card international association (PCMCIA) cards 110-1, the peripheral component interconnect (PCI) cards 110-N, and the universal serial bus (USB) devices 110-2, the aircraft 80 is able to select from many data service provider options. The aircraft owners avoid roaming charges by selecting a modem 110 in the aircraft to access cost effective data services with the required data rate in each particular region. The aircraft owner installs a new PCMCIA/PCI card 110-1/110-N or USB device 110-2 into the reconfigurable wireless modem adapter 5 without a lengthy downtime for the aircraft 80 and without wiring changes in the aircraft 80. In one implementation of this embodiment, not all the user-data interfaces 75(1-N) are connected to a modem. The unused interfaces are available for later upgrades to the system 100 by an attachment of an additional different modem to the unused user-data interface. For example, a card modem can be inserted into the slot interface. In another example, a modem is attached to a cable interface. In another implementation of this embodiment, the control board 20 is reconfigurable so that additional user-data interfaces can be added to the control board 20 during an upgrade of the control board 20.

Many different parameters and combinations of parameters can be used by the control board 20 to select the service provider. In one implementation of this embodiment, a cost performance analysis is implemented by the processor 45 executing a cost performance algorithm 14 (e.g., software 14) that is stored in a storage medium 12 in the reconfigurable wireless modem adapter 5. In this case, the control board 20 selects the service provider with the lowest cost/performance value. For a first example, the cost/performance value (having exemplary units of $/MHz) is the cost of using the data service provider divided by the average bandwidth provided by the data service provider. For a second example, the cost/performance value is a weighted cost of using the data service provider divided by a weighted average bandwidth provided by the data service provider. The weights for the cost and bandwidth are input to the memory 91 by an aircraft owner or user of the reconfigurable wireless modem adapter 5. In some embodiments, an algorithm varies the weights based on time of day, the amount of traffic at an airport at the time, or other constraints. For example, if there is heavy traffic in an airport, the weight for bandwidth (data rate) increases and the weight for cost decreases to ensure messages for the onboard system 28 are not dropped based on a data-rate quality of service (QoS) prioritization implemented by the selected data service provider.

In another implementation of this embodiment, the processor 45 makes the modem selection based on location. In yet another implementation of this embodiment, the modem for a lowest cost network is selected. If the lowest cost network is not currently available, another modem on another network is checked to determine if it is available, and so forth until the least expensive available service is selected. In yet another implementation of this embodiment, the modem is selected based on some other quality of service parameter, such as the amount of bandwidth required. For example, the modem for a first network is selected for short message service (SMS) messages, and the modem for a second network is selected when the user needs a dedicated, full time high speed data link. In yet another implementation of this embodiment, the selected modem can be switched from one modem to another as the needs of the user change during a period of operation of the reconfigurable wireless modem adapter 5.

Embodiments of the reconfigurable wireless modem adapter 5 (also referred to herein as "adapter 5") electrically interconnect several different subscriber identity module (SIM) cards 130(1-M) to third generation (3G) modem devices so that one modem is provisioned to work on different networks around the world for various data service providers. In one implementation of this embodiment, the reconfigurable wireless modem adapter 5 provisions for those PCMCIA/PCI cards and USB devices which do not have an RF signal available on the PCMCIA/PCI card connector or USB port to loop back a short piece of coax from another connector on the PCMCIA/PCI card which carries the RF signal. As is known in the art, it is possible to provide RF connectors on PCMCIA and PCI cards.

When a subscriber-identity-module-compatible modem 110-3 is selected, the processor 45 determines which of the of SIM cards 130(1-M) to select. The control logic 70 then selects the $j^{th}$ selected SIM card 130-$j$ from the plurality of SIM cards 130(1-M) via the digital multiplexer 30 based on input from the processor 45. The control logic 70 outputs a control signal via the control line 85 from the control board 20 to the digital multiplexer 30. The digital multiplexer 30 receives the control signal from the control logic 70 and, based on the received control signal, configures the digital multiplexer 30 to communicatively couple the selected SIM card 130-$j$ to the subscriber-identity-module-compatible modem 110-3 via interface 31-$j$. The digital multiplexer 30 is connected to the subscriber-identity-module-compatible modem 110-3 by the digital interface 77. Data (such as subscriber information) is sent from the selected SIM card 130-$j$ to the subscriber-identity-module-compatible modem 110-3 via interface 31-$j$ and the digital interface 77. The subscriber-identity-module-compatible modem 110-3 is connected to the control board 20 by the user-data digital interface 75-3.

The subscriber-identity-module-compatible modem 110-3 is also connected to the RF switch 50 by the digital interface 78-3. The RF switch 50 establishes a connection between the diversity/MIMO antenna 60 and the subscriber-identity-module-compatible modem 110-3. Upon initiating a network acquisition process, the subscriber-identity-module-compatible modem 110-3 uses the subscriber information on the selected SIM card 130-$j$ to authenticate the selected SIM card 130-$j$ on the network.

The control board 20 obtains position and other relevant information from onboard system 28 to determine which subscriber-identity-module-compatible modem/SIM card combination to use. The position information is compared against data loaded by the user into the memory 91 on the control board 20. In one implementation of this embodiment, the position information defines which subscriber-identity-module-compatible modem 110-$i$/SIM card 130-$j$ combination to use under certain pre-configured conditions, such as location. For example, if the position of the vehicle 80 is reported as being in the United States, the $j^{th}$ SIM card 130-$j$ for the Verizon network is selected; if the position of the vehicle is reported as being in Europe, the $k^{th}$ SIM card 130-$k$ for the T-Mobile network is selected; and if the position of the vehicle is reported as being in Japan, the $l^{th}$ SIM card 130-$i$ for the NTT network is selected.

The slots for the SIM cards 130(1-M) are not necessarily accessible to the vehicle operator, such as a pilot of an aircraft. Typically, the insertion of SIM cards 130(1-M) is done by a mechanic/technician, who infrequently changes the SIM cards 130(1-M) whenever the operator switches network service providers. In one implementation of this embodiment, the chassis 10 and the RF switch 50 are located in an equipment bay on the vehicle 80 which is typically be accessed by mechanics and/or technicians. In another implementation of this embodiment, the plurality of SIM cards 130(1-M) are inserted into slots that are available from outside the chassis 10.

The processor 45 executes software 14 and/or firmware that causes the processor 45 to perform at least some of the processing described here as being performed by the reconfigurable wireless modem adapter 5. At least a portion of such software 14 and/or firmware executed by the processor 45 and any related data structures are stored in non-transitory storage medium 12 during execution of the software 14. Memory 91 comprises any suitable memory now known or later developed such as, for example, random access memory (RAM), read only memory (ROM), and/or registers within the processor 45. In one implementation, the processor 45 comprises a microprocessor or microcontroller. Moreover, although the processor 45 and memory 91 are shown as separate elements in FIG. 1, in one implementation, the processor 45 and memory 91 are implemented in a single device (for example, a single integrated-circuit device). The software 14 and/or firmware executed by the processor 45 comprises a plurality of program instructions that are stored or otherwise embodied on a storage medium 12 from which at least a portion of such program instructions are read for execution by the processor 45. In one implementation, the processor 45 comprises processor support chips and/or system support chips such as application-specific integrated circuits (ASICs).

In one implementation of this embodiment, the onboard system 28 includes onboard user terminals. In another implementation of this embodiment, the vehicle 80 is an aircraft, the reconfigurable wireless modem adapter 5 is an aeronautical reconfigurable wireless modem adapter 5, and the onboard system 28 includes one or more of a communications management unit (CMU) and a cabin server. In yet another implementation of this embodiment, the interfaces are selected from at least one personal computer memory card international association (PCMCIA) interface, at least one universal serial bus (USB) interface, at least one peripheral component interconnect (PCI) interface, and at least one subscriber identity module (SIM) interface in a digital switch communicatively coupled to at least one modem that is operable to interface with a subscriber-identity-module-compatible modem.

The embodiments shown herein are not intended to limit the types of modems or the numbers of each type of modem. There are at least two modems, which can be the same type or of different types. Specifically, the reconfigurable wireless modem adapter 5 can include one of each type of modem, or multiples of different types of modems. In one implementation of this embodiment, the modems can be one or more of a PCMCIA modem, USB modem, PCI modem, and/or a subscriber-identity-module-compatible modem. Other types of modems are possible including future developed modems.

Figure 2:
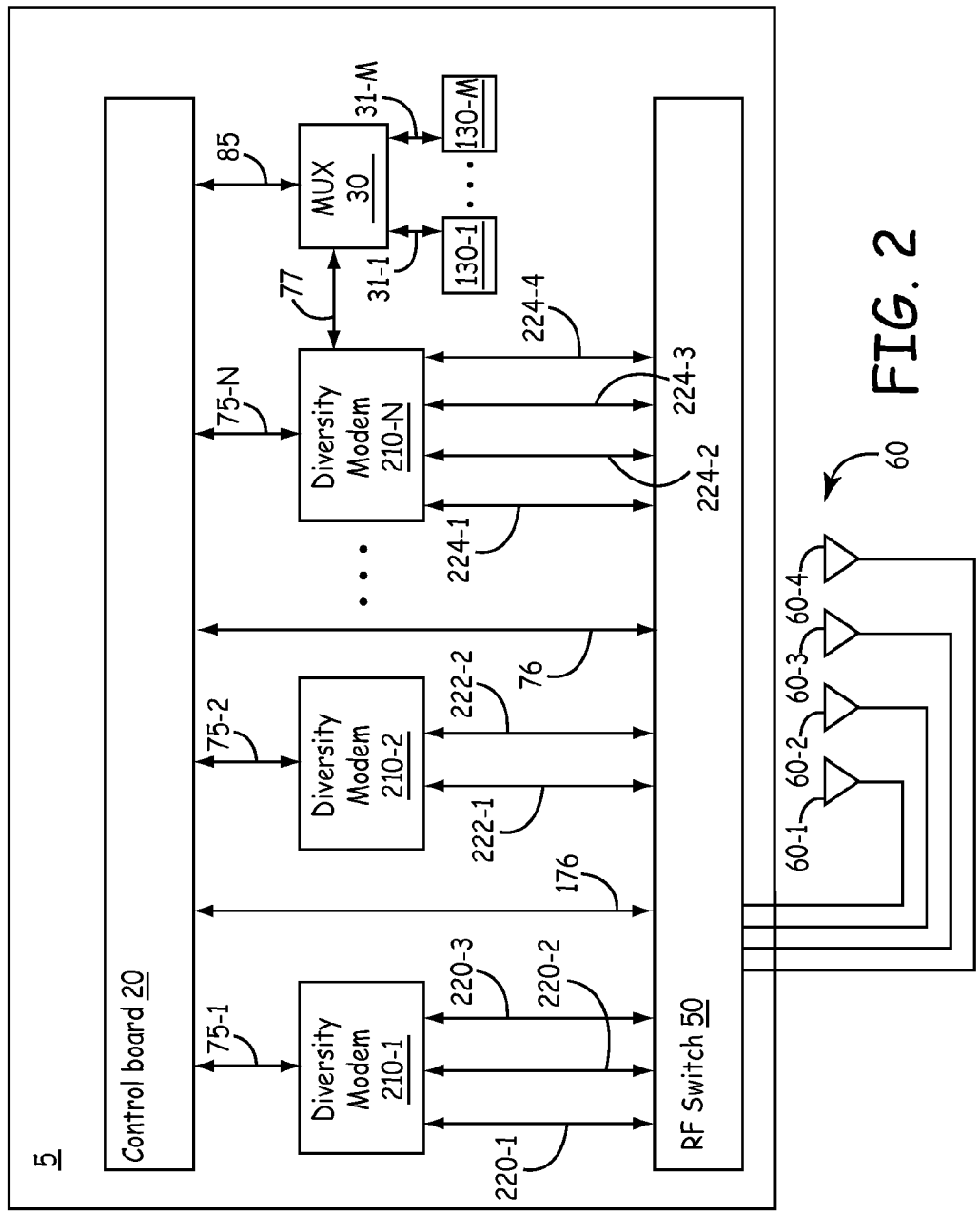
FIG. 2 shows an embodiment of at least two diversity modems in the reconfigurable wireless modem adapter of FIG. 1 for communicatively coupling a radio frequency switch to a control board in accordance with the present invention.

FIG. 2 shows an embodiment of at least two diversity modems 210(1-N) in the reconfigurable wireless modem adapter 5 of FIG. 1 for communicatively coupling a radio frequency switch 50 to a control board 20 in accordance with the present invention. The diversity modem 210-1 includes three radio frequency ports (not shown) that are connected to the radio frequency switch 50 by three respective radio frequency links 220(1-3). When diversity modem 210-1 is selected by the control board 20, the three respective radio frequency links 220(1-3) are communicatively coupled to three of the four antenna elements 60(1-4) in the diversity/MIMO antenna 60. The selection of which of the three antenna elements 60(1-4) in the diversity/MIMO antenna 60 are to be selected is based on the control signal sent from the control board 20 to the radio frequency switch 50 via the modem-select interface 76.

The diversity modem 210-2 includes two radio frequency ports (not shown) that are connected to the radio frequency switch 50 by two respective radio frequency links 222(1-2). When diversity modem 210-2 is selected by the control board 20, the two respective radio frequency links 222(1-2) are communicatively coupled to two of the four antenna elements 60(1-4) in the diversity/MIMO antenna 60. The selection of which of the two antenna elements 60(1-4) in the diversity/MIMO antenna 60 are to be selected is based on the control signal sent from the control board 20 to the radio frequency switch 50 via the modem-select interface 76.

Similarly, the diversity modem 210-N includes four radio frequency ports (not shown) that are connected to the radio frequency switch 50 by four respective radio frequency links 224(1-4). When diversity modem 210-N is selected by the control board 20, the four radio frequency links 224(1-4) are communicatively coupled to each of the four antenna elements 60(1-4) in the diversity/MIMO antenna 60. A diversity/MIMO modem with four radio frequency ports is known as a "quad-diversity antenna" or a "quad-diversity/MIMO antenna". If the diversity/MIMO antenna 60 includes more than four antenna elements 60(1-N), the selection of which of the four antenna elements 60(1-4) in the diversity/MIMO antenna 60 is to be selected is based on the control signal sent from the control board 20 to the radio frequency switch 50 via the modem-select interface 76.

Figure 3:
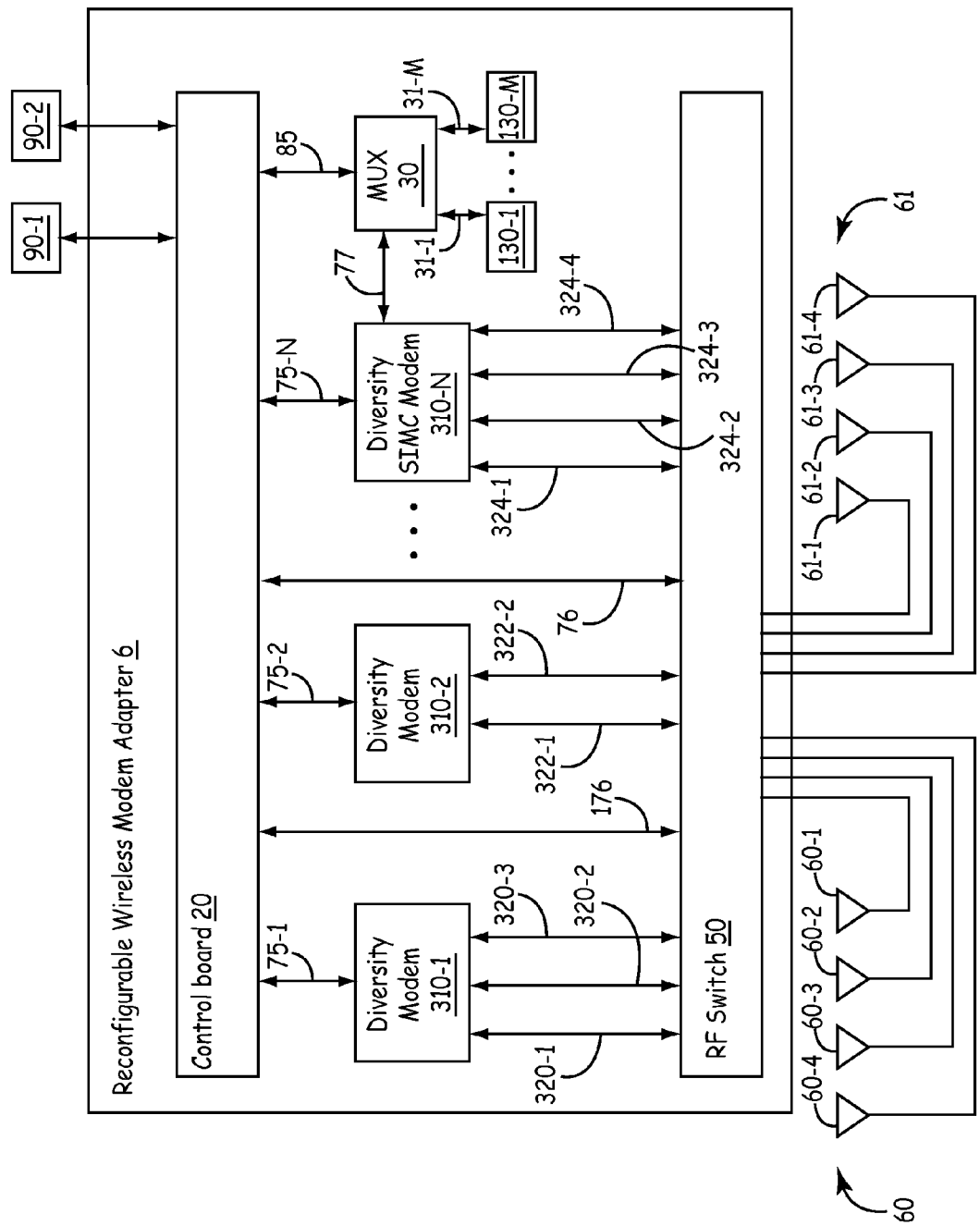
FIG. 3 shows an embodiment of at least two diversity modems in a reconfigurable wireless modem adapter for communicatively coupling a radio frequency switch to a control board in accordance with the present invention.

FIG. 3 shows an embodiment of at least two diversity modems 310(1-N) in a reconfigurable wireless modem adapter 6 for communicatively coupling a radio frequency switch 50 to a control board 20 in accordance with the present invention. The embodiment of at least two diversity modems 310(1-N) in the reconfigurable wireless modem adapter 6 is similar in structure to the reconfigurable wireless modem adapter 5 shown in FIG. 2, except that two diversity/MIMO antennas 60 and 61 are communicatively coupled to the radio frequency switch 50. The reconfigurable wireless modem adapter 6 is similar in function to the reconfigurable wireless modem adapter 5 shown in FIG. 1, except that the two diversity/MIMO antennas 60 and 61 are operable to move data onto and off of the vehicle 80 at the same time. In one implementation of this embodiment, the two diversity/MIMO antennas 60 and 61 are communicatively coupled to two different onboard systems 90(1-2), respectively, in the vehicle 80 at the same time. In another implementation of this embodiment, the diversity/MIMO antennas 60 and 61 are communicatively coupled to two respective RF switches 50 in the chassis 10.

In one implementation of this embodiment, the two diversity/MIMO antennas 60 and 61 operate in two different frequency bands. In one such embodiment, the reconfigurable wireless modem adapter is configured to connect one of the two diversity/MIMO antennas 60 and 61 at a time to connect to a single onboard system 90. In another such embodiment, the reconfigurable wireless modem adapter 6 is configured to connect the two diversity/MIMO antennas 60 and 61 to two respective onboard systems 90(1-2) in the two different frequency bands.

FIG. 4 shows an embodiment of diversity modems 410(1-N) and a single-input-single-output (SISO) modem 450 in the reconfigurable wireless modem adapter 5 of FIG. 1 for communicatively coupling a radio frequency switch 50 to a control board 20 in accordance with the present invention. The diversity modems 410(1-N) have the structure and functionality of the diversity modems 210(1-N) shown in FIG. 2.

When SISO modem 450 is selected by the control board 20, the single radio frequency link 460-1 is communicatively coupled to one of the four antenna elements 60(1-4) in the diversity/MIMO antenna 60. If the diversity/MIMO antenna 60 includes more than four antenna elements 60(1-N), the selection of which of the four antenna elements 60(1-4) in the diversity/MIMO antenna 60 is to be selected is based on the control signal sent from the control board 20 to the radio frequency switch 50 via the modem-select interface 76.

FIG. 5 is a flow diagram of one embodiment of a method 500 to reconfigurably move data onto and off of a vehicle 80 via a reconfigurable wireless modem adapter in accordance with the present invention. The method 500 uses data services to move data onto and off of the vehicle 80. The method 500 is described with reference to the wireless modem adapters 5 of reconfigurable-wireless-modem-adapter system 100 shown in FIG. 1. It is to be understood that method 500 can be implemented using any of the exemplary interface configurations shown in FIGS. 2, 3, and 4. Other embodiments of the reconfigurable-wireless-modem-adapter system 100 using other interface configurations to connect the radio frequency switch 50 to the control board 20 can be used as is understandable by one skilled in the art who reads this document.

At block 502, an on-board system interface 34 of a control board 20 is communicatively coupled to at least one onboard system 28 on a vehicle 80.

At block 504, the control board 20 is connected to the radio frequency switch 50 via a modem-select interface 76. The modem-select interface 76 can be a cable or a trace line on a circuit board. In one implementation of this embodiment, the control board 20 is also connected to the radio frequency switch 50 via a radio frequency connection 176. The radio frequency connection 176 permits the radio frequency spectral content received at the diversity/MIMO antenna 60 to be sent directly to the control board 20 via the radio frequency switch 50.

At block 506, at least one diversity/MIMO antenna 60 and/or 61 on the vehicle 80 is communicatively coupled to the radio frequency switch 50 via the RF connector 79. In one implementation of this embodiment, at least one of the antenna elements 60(1-L) on the vehicle 80 is communicatively coupled to the radio frequency switch 50 via the radio frequency links 79(1-L).

At block 508, a cost/performance-based algorithm in the software 14 is implemented by the processor 45 to determine the least expensive available data service operable to provide the required performance. In one implementation of this embodiment, the user preferences for a given location of the vehicle 80 are stored in the memory 91 and the processor 45 retrieves the stored user preferences prior to executing the software 14. In this latter embodiment, the cost/performance-based algorithm is not run. If there is only one available data service provider at the diversity/MIMO antenna 60, that data service provider is automatically selected. In one implementation of this embodiment, the service provider is selected for reasons other than cost (e.g., bandwidth). In that case, the cost/performance-based algorithm is not implemented.

In one implementation of this embodiment, during the process of selecting the data service provider, the control board 20 cycles through all of the installed modems 110(1-N) to determine which data service providers are communicatively available to reconfigurable-wireless-modem-adapter system 100 via the diversity/MIMO antenna 60. In this case, the controller commands the RF switch 50 to connect one modem 110-i at a time to the antenna 60 to see if the modem 110-i can pick up a signal from its associated service provider.

If the modem 110-i detects a signal, the control board 20 then queries the enabled modem 110-i to provide type/quality of service availability. After cycling through all the different modems 110(1-N), the control board 20 determines which of the available services to use. If there is more than one available data service provider, the processor 45 executes cost/performance-based algorithm to determine which data service provider is to be selected. In another implementation of this embodiment, the processor 45 reviews a table to determine which data service provider is to be selected.

In another implementation of this embodiment, during the process of selecting the data service provider, a broad band monitor (not shown) in the RF switch 50 and control board 20 monitors received signals to determine if there is activity in certain bands and then correlates the activity in those bands to services that are available, without switching the modems 210(1-N). In this case, the control board 20 receives the signals in the various frequency bands via the radio frequency connection 176. In this manner, the control board 20 is configured to recognize when a service becomes available and to determine if the newly available service is preferred over the current service, without the need to cycle the modems 210(1-N). And in this manner, the control board 20 is able to determine what data service providers are available to the diversity/MIMO antenna 60 when the vehicle 80 arrives at a location.

At block 510, one of at least one data service provider available to the antenna is selected at the control board 20. At block 512, one of the at least two modems is selected by the control logic 70 and the processor 45 based on a compatibility between the type of modem selected (e.g., diversity/MIMO PCMCIA, diversity/MIMO USB, diversity/MIMO PCI modem, SISO PCMCIA, SISO USB, or SISO PCI modem) and the selected data service provider. The selected modem is the modem, which is to be activated to move data onto and off of the vehicle 80. The control signals are sent from the control board 20 to the RF switch 50 modem-select interface 76. The control signals are based on the selection of the data service provider and the selected modem 110-i.

At block 514, the data multiplexer 71 on the control board 20 is configured to activate the selected one of the at least two modems based on the selection of the available data service provider. When the selected modem is activated, the control board 20 is communicatively coupled to the radio frequency (RF) switch 50 via the selected modem 110-i. In one implementation of this embodiment, the control board 20 is communicatively coupled to the RF switch 50 via at least one modem 110-i by attaching the at least one modem 110-i to a user-data interface 75-i connected to the control board 20 and communicatively coupling the attached at least one modem 110-i to the radio frequency switch 50 via radio frequency link 78-i. At least one of the radio frequency links 78(1-N) (FIG. 1) includes at least two radio frequency links, such as radio frequency links 220(1-3), 222(1-2), 224(1-3) as shown in FIG. 2.

At block 516, the radio frequency switch 50 is configured to communicatively couple the selected one of the at least two modems 110(1-N) to the diversity/MIMO antenna 60 via at least two radio frequency links, such as radio frequency links 220(1-3). In this manner, the activated selected modem 110-i is implemented to communicatively couple the diversity/MIMO antenna 60 to the onboard system 28. By an implementation of blocks 512, 514 and 516, the control board 20 is communicatively coupled to the radio frequency switch 50 via the selected modem 110-i.

At block 518, a network acquisitions process is initiated based on processing internal to the selected modem 110-i. In one implementation of this embodiment, network acquisitions process includes sending and receiving a handshake. Once the network acquisitions process is initiated, an end-to-end data transfer is available to the onboard system 28 from a remote system/device.

In another implementation of this embodiment, the selected modem 110-*i* is the subscriber-identity-module-compatible modem 110-3. In this case, one of the SIM cards 130(1-M) is selected based on the type of data service provider. Then, the subscriber information on one of the selected SIM card 130-*j* in the slot on the digital multiplexer 30 is used to authenticate the subscriber-identity-module-compatible modem 110-3 on the network during the initiation process.

The operator of the vehicle 80 is able to upgrade or reconfigure the wireless modem adapter 5 in many ways. Blocks 520 and 522 are optional methods to upgrade or reconfigure the wireless modem adapter 5. Other methods to upgrade or reconfigure the wireless modem adapter 5 are also possible. At block 520, an additional user-data interface 75-P (where P>N) is provided to upgrade the data services to move data onto and off of aircraft 80. In one implementation of this embodiment, the additional user-data interface 75-P is connected to the control board 20 as an additional slot in the chassis 10 or in the reconfigurable wireless modem adapter 5. In yet another implementation of this embodiment, the additional user-data interface 75-P is a cable attached to the control board 20.

At block 522, an additional modem is attached to the additional user-data interface 75-P that was provided during the process of block 520. In another implementation of method 500, the control board 20 has unused (empty) interfaces for additional modems. In this case, an additional modem is attached to the unused user-data interface 75-N to upgrade the commercial data services to move data onto and off of aircraft 80.

In one implementation of this embodiment, the software required to upgrade the reconfigurable wireless modem adapter 5 is provided to the currently available software 14 by attaching a data loader 26 to a data-loader interface 25 of the control board 20. The data from the data loader 26 is then loaded onto the at least one onboard system 28 on the vehicle 80. In some embodiments, the data-loader interface 25 is available to the user or technician doing the upgrade through a connector in the chassis 10. For example, an operator is able to update the program and/or network preference tables in the memory 91 by inserting the data loader 26 into the data-loader interface 25.

In this manner, the reconfigurable wireless modem adapter allows the owner of an aircraft to easily and inexpensively change/upgrade from one data service provider to another service provider as technologies evolve over the lifetime of the aircraft without taking the aircraft out-of-service while upgrading to new avionics installations. In many cases, the upgrade does not require recertification of the avionics.

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A reconfigurable wireless modem adapter, comprising:
    a control board having at least two user-data interfaces for respective at least two dissimilar modems, the at least two dissimilar modems including at least one diversity/multiple-input-multiple-output (MIMO) modem, wherein the control board is configured to communicatively couple to at least one onboard system in a vehicle, and wherein the control board is configured to activate a selected one of the at least two dissimilar modems interfaced to one of the at least two user-data interfaces; and
    a radio frequency switch communicatively coupled to the control board via a modem-select interface and via the selected one of the at least two dissimilar modems, wherein the radio frequency switch is configured to communicatively couple one of at least one diversity/MIMO antenna on the vehicle to the selected one of the at least two dissimilar modems based on a control signal sent from the control board to the radio frequency switch via the modem-select interface.

2. The reconfigurable wireless modem adapter of claim 1, wherein the at least two dissimilar modems include at least one single-input-single-output (SISO) modem, wherein the control board is further configured to activate one of the at least one SISO modem interfaced to one of the at least two user-data interfaces when the one of the at least one SISO modem is selected by the control board, so that the radio frequency switch is communicatively coupled to the control board via the selected one of the at least one SISO modem, wherein the radio frequency switch is configured to communicatively couple one element of the at least one diversity/MIMO antenna on the vehicle to the selected one of the at least one SISO modem based on a control signal sent from the control board to the radio frequency switch via the modem-select interface.

3. The reconfigurable wireless modem adapter of claim 2, wherein the control board includes:
    a data multiplexer; and
    control logic to configure the data multiplexer to activate the selected modem, the selected modem being one of the at least one diversity/MIMO modem and the at least one SISO modem, wherein the data multiplexer routes user data from the onboard system to and from the selected modem, wherein the control board further includes a processor to perform an analysis based on information indicative of available service providers, and to output information indicative of the selected modem based on the analysis, wherein the control logic receives the information indicative of the selected modem and configures the data multiplexer based on the received information to activate the selected modem.

4. The reconfigurable wireless modem adapter of claim 3, wherein the information indicative of available service providers includes information indicative of the service providers currently available via the at least one diversity/MIMO antenna, information indicative of data bandwidth available from the currently available service providers, information indicative of a cost of using the currently available service providers, and information indicative of a quality of service provided by the currently available service providers.

5. The reconfigurable wireless modem adapter of claim 2, further comprising:
    a digital switch, wherein the control board sends a control signal to the digital switch to connect one of at least two subscriber identity module cards to the control board via one of the at least two dissimilar modems.

6. The reconfigurable wireless modem adapter of claim 1, wherein the control board is connected to a data-loader interface, and wherein a data loader attached to the data-loader interface is communicatively coupled to the control board.

7. The reconfigurable wireless modem adapter of claim 1, wherein the control board includes:
a data multiplexer; and
control logic to configure the data multiplexer to activate the selected modem, wherein the data multiplexer routes user data from the onboard system to and from the selected modem, wherein the control board further includes a processor to perform an analysis based on information indicative of available service providers, and to output information indicative of the selected modem based on the analysis, wherein the control logic receives the information indicative of the selected modem and configures the data multiplexer based on the received information to activate the selected modem.

8. The reconfigurable wireless modem adapter of claim 7, wherein the information indicative of available service providers includes information indicative of the service providers currently available via the at least one diversity/MIMO antenna, information indicative of data bandwidth available from the currently available service providers, information indicative of a cost of using the currently available service providers, and information indicative of a quality of service provided by the currently available service providers.

9. A method to use data services to move data onto and off of a vehicle, the method comprising:
communicatively coupling an onboard-system interface of a control board to at least one onboard system on the vehicle;
communicatively coupling at least one diversity/MIMO antenna on the vehicle to a radio frequency switch;
selecting one of at least one data service provider available to the at least one diversity/MIMO antenna at the control board;
configuring a data multiplexer on the control board to activate a selected one of at least two dissimilar modems, the at least two dissimilar modems including at least one diversity/MIMO modem, the configuring being based on the selecting of the available data service provider, wherein the control board is communicatively coupled to the radio frequency switch via the selected one of the at least two dissimilar modems; and
initiating a network acquisitions process based on processing internal to the selected one of the at least two dissimilar modems.

10. The method of claim 9, wherein communicatively coupling the control board to the radio frequency switch via the at least one modem comprises:
attaching the at least two dissimilar modems to at least two respective data-user interfaces connected to the control board;
communicatively coupling the attached at least two dissimilar modems to the radio frequency switch, the method further comprising:
selecting the selected one of the at least two dissimilar modems to activate, based on a compatibility between a modem-type of the at least two dissimilar modems attached to the at least two respective data-user interfaces and the selected data service provider; and
configuring the radio frequency switch to communicatively couple the selected one of the at least two dissimilar modems to at least one element of the at least one diversity/MIMO antenna.

11. The method of claim 9, wherein selecting one of the at least one data service provider available to the at least one diversity/MIMO antenna at the control board comprises:
implementing a cost/performance-based algorithm to determine the least expensive available data service operable to provide the required performance.

12. The method of claim 9, further comprising:
providing an additional user-data interface to upgrade the data services to move data onto and off of the vehicle; and
attaching an additional modem to the additional user-data interface.

13. The method of claim 9, further comprising:
attaching an additional modem to an unused user-data interface of the control board to upgrade the data services to move data onto and off of the vehicle.

14. The method of claim 9, further comprising:
communicatively coupling the control board to the radio frequency switch via at least one subscriber-identity-module-compatible modem, the method further comprising:
connecting the control board to a digital multiplexer;
connecting the at least one subscriber-identity-module-compatible modem to the digital multiplexer; and
attaching at least one subscriber identity module card to an interface on the digital multiplexer.

15. The method of claim 14, further comprising:
activating one of the at least one subscriber-identity-module-compatible modem, wherein initiating the network acquisitions process comprises:
using subscriber information on one of the at least one subscriber identity module card in the interface on the digital multiplexer to authenticate the at least one subscriber-identity-module-compatible modem on the network.

16. The method of claim 9, further comprising:
attaching a data loader to a data-loader interface of the control board; and
loading data from the data loader to the control board based on the attaching of the data loader to the data-loader interface.

17. A reconfigurable-wireless-modem-adapter system, comprising:
a control board having a plurality of user-data interfaces for a respective plurality of modems, the control board comprising;
a data multiplexer,
a processor,
control logic, and
an onboard-system interface to an onboard system;
at least two dissimilar modems attached to a respective at least two of the plurality of user-data interfaces, wherein the at least two dissimilar modems include at least one diversity/MIMO modem; and
a radio frequency switch communicatively coupled to the control board in parallel via the at least two dissimilar modems and communicatively coupled to at least one diversity/multiple-input-multiple-output (MIMO) antenna on a vehicle, wherein, when one of the at least two dissimilar modems is selected by the processor, the control logic configures the data multiplexer to activate the selected modem, wherein one of the at least one diversity/MIMO antenna is communicatively coupled via the selected modem to the onboard system communicatively coupled to the onboard-system interface.

18. The reconfigurable-wireless-modem-adapter system of claim 17, wherein the at least two dissimilar modems include at least one single-input-single-output (SISO) modem, and wherein, when one of the at least one SISO modem is selected by the processor, the control logic configures the data multiplexer to activate the selected SISO modem, wherein one element of the at least one diversity/MIMO antenna is communicatively coupled via the selected SISO modem to the onboard system communicatively coupled to the onboard-system interface.

19. The reconfigurable-wireless-modem-adapter system of claim 17, further comprising:
a digital switch connected to the control board via a control line and connected to a subscriber-identity-module-compatible modem via a digital interface, the digital switch including at least two interfaces compatible with at least two subscriber identity module cards.

20. The reconfigurable-wireless-modem-adapter system of claim 19, further comprising at least one subscriber identity module card inserted into the at least two interfaces compatible with at least two subscriber identity module cards.

* * * * *